United States Patent [19]

Brokaw

[11] Patent Number: 5,326,267
[45] Date of Patent: Jul. 5, 1994

[54] FLEXIBLE TERRAIN FEATURES FOR MINIATURE MODELING

[76] Inventor: James W. Brokaw, 3611 Quail Ridge La., Matthews, N.C. 28105

[21] Appl. No.: 684,027

[22] Filed: Apr. 11, 1991

[51] Int. Cl.⁵ ............................................. G09B 29/12
[52] U.S. Cl. ................................. 434/151; 273/241; 434/152; 434/150
[58] Field of Search ............ 434/150, 151, 152; 273/241, 245, 283, 284, 255, 262, 176; 446/108, 116, 118

[56] References Cited

U.S. PATENT DOCUMENTS

| | | | |
|---|---|---|---|
| 1,315,483 | 9/1919 | Edwards | 273/262 |
| 1,393,163 | 10/1921 | Rasely | 434/151 |
| 2,942,354 | 6/1960 | Grain | 434/72 |
| 3,025,626 | 3/1962 | Schumacher | 446/108 X |
| 3,206,887 | 9/1965 | Eyler et al. | 273/284 X |
| 3,768,181 | 10/1973 | Kiener | 434/152 |
| 4,652,239 | 3/1987 | Brimberg | 434/80 |
| 5,000,715 | 3/1991 | Johnson | 446/427 |

FOREIGN PATENT DOCUMENTS

| | | | |
|---|---|---|---|
| 18371 | 11/1904 | Austria | 446/118 |
| 829119 | 1/1952 | Fed. Rep. of Germany | 446/118 |
| 2611156 | 1/1977 | Fed. Rep. of Germany | 434/72 |
| 3214644 | 10/1983 | Fed. Rep. of Germany | 434/151 |
| 999876 | 2/1952 | France | 446/118 |
| 397533 | 8/1933 | United Kingdom | 446/108 |
| 2176125 | 12/1986 | United Kingdom | 446/118 |

Primary Examiner—Gene Mancene
Assistant Examiner—L. Thomas
Attorney, Agent, or Firm—Clifton Ted Hunt

[57] ABSTRACT

Model terrain accessories that are positioned for use on the surface of a miniature landscape are fabricated from a permanently flexible material, preferably polyvinyl chloride. These flexible accessories are realistically contoured models representing roads, streams, stream banks, earthworks, and walls, or segments thereof. These flexible accessories will conform to changes in surface elevation on any miniature landscape on which they are assembled. The flexible accessories fit together easily in an infinite variety of individual and group configurations, and can be easily removed from the landscape surface and reused when desired.

4 Claims, 2 Drawing Sheets

FLEXIBLE TERRAIN FEATURES FOR MINIATURE MODELING

FIELD OF THE INVENTION

This invention relates to flexible models of natural and man-made terrain accessories, such as roads and streams, for model layouts of terrain wherein full size landscapes are reproduced in miniature.

BACKGROUND OF THE INVENTION

Miniature layouts of landscape surfaces are commonly used for scale model toy railroads and adventure games using miniature figures. Such landscape surfaces often contain accessories, such as roads, streams, earthworks, walls, and the like. These accessories are of a type that can be modeled on top of the landscape surface after the topography of hills and valleys is completed. The accessories are typically oblong shapes.

The accessories are sometimes permanently attached to the landscape surface. Prior art accessories, such as roads, river banks, earthworks, and walls are typically made of epoxy putty, sheetrock spackle, or some other material that can be applied when soft and allowed to harden in place. Streams and rivers are cast in place with high gloss polyester resin or some other material and painted or varnished to look like water.

These accessories conform to the configuration of the landscape surface but once fixed in place are unchangeable so there is no variability in either their overall configuration as a group or in their individual placement. This is a prohibitive disadvantage for those who want to change the accessories from time to time, such as between adventure games. Another disadvantage is that such permanent accessories are time consuming to create.

The common alternative to using permanently attached terrain accessories is to use removable terrain accessories. Roads, streams, stream banks, walls, and earthworks are commercially available. These prior art removable accessories are made from rigid materials such as hard cast resin, hard foam, ceramics, ABS plastics, cardboard, etc. Rigid accessories, such as roads and fences, for example, will not go over hills, but they can be used in various combinations or be independently placed on flat landscape surfaces. They can also be used to make turns or curves to the extent that the rigid accessories are curved or bent. Thus, these prior art rigid accessories are limited in their variability of overall group configurations and in their individual placement. Moreover, these rigid accessories, particularly if used in combinations, have an unnatural geometric look when assembled for use.

Homemade terrain accessories such as roads and rivers have been made from colored cloth strips, masking tape, cardboard, acetate, and even chalk marks on a tabletop. Walls and earthworks have been made from balsa wood or other rigid materials. Rigid homemade accessories are even less realistic in appearance than the correspondingly rigid commercially available accessories and have the same disadvantage of being limited in variability. Non-rigid homemade accessories are more variable in configuration and will go over hills and around corners, but masking tape and the like have a very limited visual appeal because they are not realistically contoured models.

In recent years, inventors and modelers have tried to combine the superior appearance of permanently attached terrain accessories with the variability of removable features by the use of modular landscape systems. U.S. Pat. No. 3,352,054 to Glass et al. discloses a modular system using interchangeable tiles. Such systems use large modules and have limited variability. Features such as roads and rivers that are attached to the tiles cannot be changed, only the placement of the tiles in relation to each other may be changed.

Other modular systems use smaller modules, often in hexagon shapes that can be put together in many different combinations. This allows greater variability, but in order to get a certain accessory on the terrain, a separate module with that accessory on it is required. All of the modular systems are time consuming to assemble and there are many joints between the modules which detract from the visual appeal of the assembled terrain and accessories.

SUMMARY OF THE INVENTION

It is an object of the present invention to provide miniature terrain accessories that are flexible and that thereby have the advantage of being able to be accommodated to changes in the contour of miniature landscape surfaces.

Other advantages of the flexible accessories of this invention are:

The flexible accessories fit together easily in infinitely variable configurations;

The material from which the flexible accessories are formed tends to adhere to the miniature landscape surface, but the flexible accessories are nevertheless easily removable and reusable;

The flexible accessories are realistically contoured to minimize or avoid a geometric appearance when the accessories are assembled on a landscape surface for use; and The flexible accessories minimize the number of discrete pieces needed to make use of extended accessories, and it takes less time to assemble the smaller number of flexible accessories in a desired configuration on a landscape surface than it takes to assemble the accessories of the prior art.

DETAILED DESCRIPTION OF THE INVENTION

Figure 1:
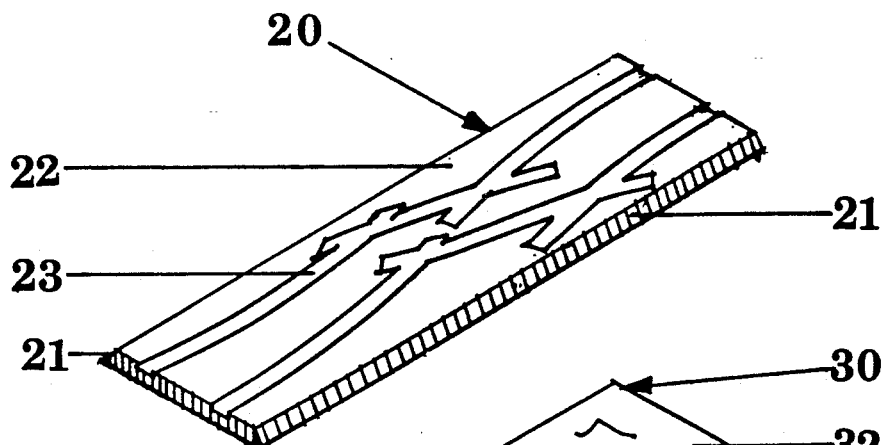
FIG. 1 is a perspective view of a flexible accessory shaped and decorated to be a model of a segment of a road.

The flexible accessories of this invention are preferably produced from a material that is flexible in all directions, such as rubber or a soft plastic material such as polyvinyl chloride. Polyvinyl chloride is the preferred material to use for making the flexible accessories for the following reasons:

Polyvinyl chloride can be softened with different plasticizers to any desired durometer. Softness may vary depending on the characteristics of durability and flexibility required for each accessory.

Polyvinyl chloride is much less expensive than other materials, such as silicone rubber. Polyvinyl chloride is available as a plastisol and so is easy to process. As a thermoplastic, polyvinyl chloride can be heated, as by microwave, until it turns clear, then poured directly into an open faced mold and allowed to cool and harden. Molds for this simple casting process are easily and inexpensively made from a wide variety of readily available materials. Suitable casting methods are well known to those skilled in the art for large scale production. Thus, realistic flexible polyvinyl chloride terrain accessories can be reproduced efficiently and inexpensively in either small or large production runs.

Polyvinyl chloride can be decorated to the highest degree of realism. Polyvinyl chloride can be colored to a solid or semitransparent color during fabrication. After fabrication, and as part of the decoration process, polyvinyl chloride may be tinted a transparent color using conventional tints and dyes. Conventional paints will adhere well to flexible polyvinyl chloride and may be applied either full body, thinned to a wash, or dry brushed to produce realistic color variations. Other conventional paints can be applied over previously painted surfaces to attach model railroad flocking and the like, Nitrile rubber based adhesives will also act as an adhesive on many polyvinyl chlorides. Using these, or other methods or products, flexible terrain accessories can be decorated either before or after sale to the consumer.

The flexibility of polyvinyl chloride is its most important asset. Polyvinyl chloride has the surprising advantage of being flexible both horizontally and vertically at the same time throughout the length of an accessory, while maintaining a uniform transverse dimension. Thus, accessories made from polyvinyl chloride may be readily shaped into a curve that also conforms with hilly terrain. Each segment of an accessory made from polyvinyl chloride can be bent as required and will hold its shape for as long as needed, after which it can be taken up and reused in the same or different curvature. Small and infinite variations in curvature are possible.

Finally, flexible polyvinyl chloride has a slightly tacky feel. Accessories made from this material will, therefore, tend to grab the landscape surface and stay in place until it is desired to remove them.

Referring to the drawings, FIGS. 1–5 illustrate typical examples of flexible accessories. To take full advantage of their flexibility, the accessories, and their segments, are preferably fabricated by making them elongated with small height and width dimensions relative to their length. Accessories made up of intersections of oblong shapes are also useful. The segments of all accessories of the same type and scale maintain the same cross sectional dimension throughout their length. FIGS. 1–5 illustrate short segments of much longer models.

Figure 10:
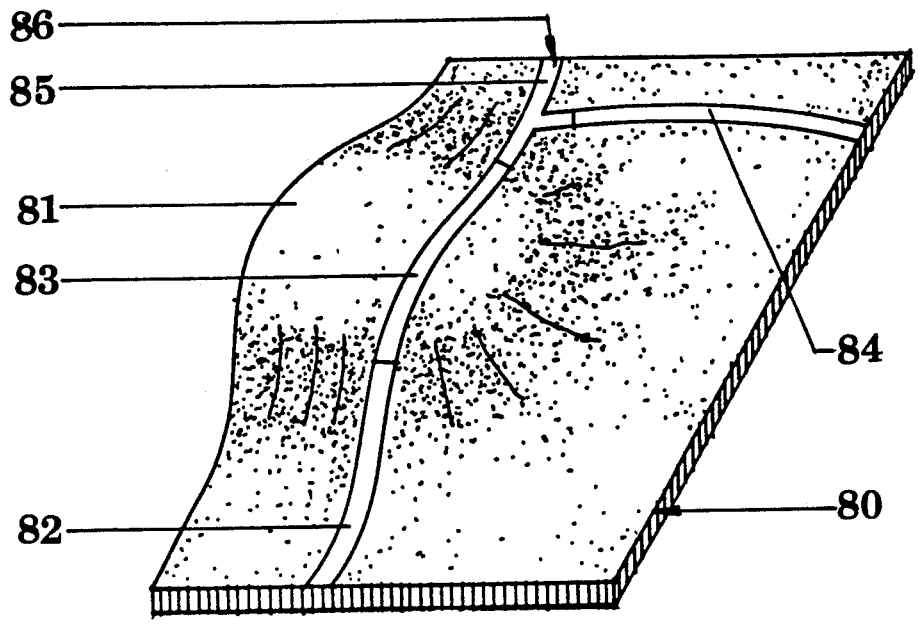
FIGS. 10 and 11 are perspective views of a flexible assemblage of model roads assembled in different positions on the same contoured landscape surface.
Figure 11:
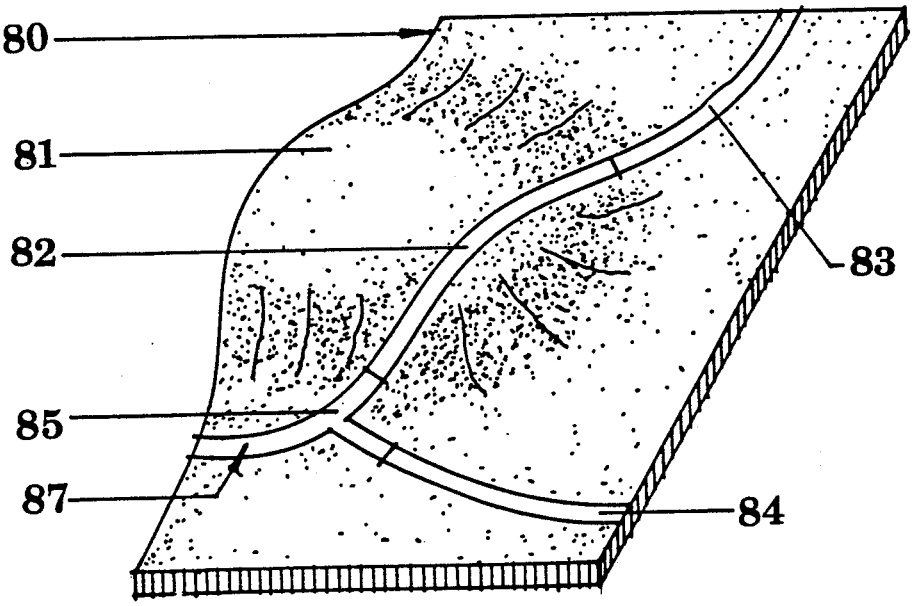

FIG. 1 illustrates an accessory comprising a segment of a miniature road or pathway, broadly indicated at 20. A beveled edge 21 is provided for improved appearance on either side of a flat travel surface 22. Ruts add realism for a dirt road. The travel surface 22 may be smooth for paved roads. Roads are preferably fabricated in long ribbon-like shapes. They may also be made in "X", "Y", or "T" shapes for intersections or in various curved shapes. A "T" shaped intersection 85 is illustrated in FIGS. 10 and 11. Colored in an appropriate dirt or pavement color during or after fabrication, roads may be decorated with a coat of washed or dry brushed paint in a contrasting color for museum quality realism.

Figure 2:
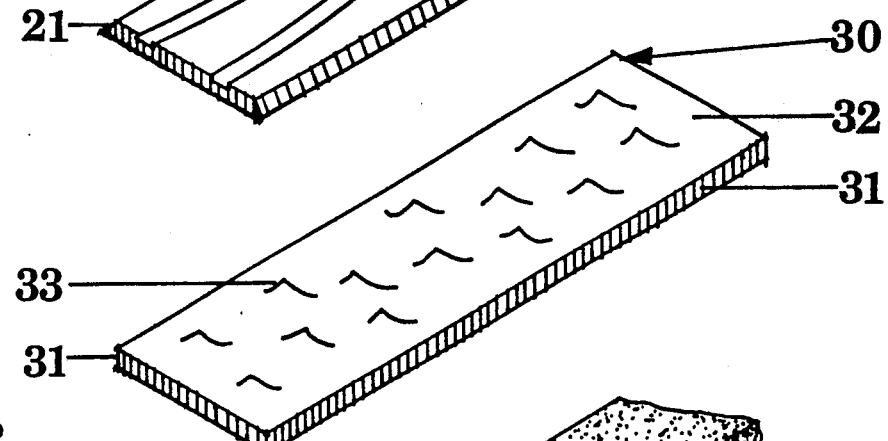
FIG. 2 is a perspective view of a flexible accessory shaped and decorated to be a model of a segment of a stream.

FIG. 2 illustrates an accessory comprising a segment of a stream, river, or other flowing water accessory, broadly indicated at 30. Short vertical sides 31 are provided on both sides of a horizontal water surface 32. Ripples 33 are provided to look like flowing water. A smooth surface is also possible. Streams may be used with or without banks and are most advantageously fabricated in long ribbon-like shapes. Sharp curves or other natural shapes are possible including "Y" shapes for a stream fork. Streams should be fabricated from a clear material tinted a semitransparent blue or brown.

Figure 3:
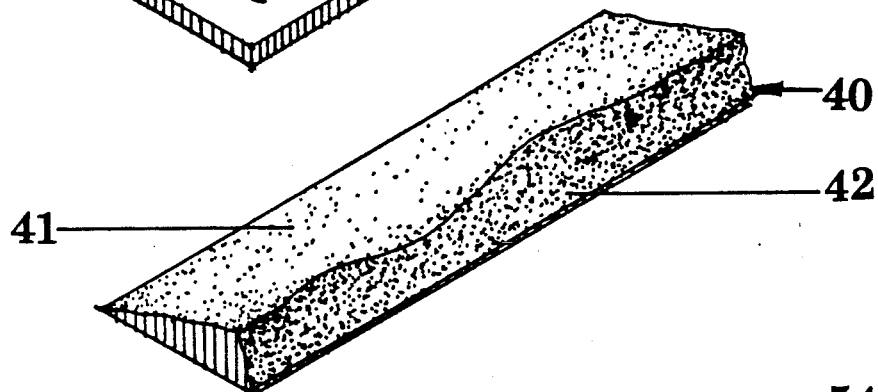
FIG. 3 is a perspective view of a flexible accessory shaped and decorated to be a model of a segment of a stream bank.

FIG. 3 illustrates an accessory comprising a segment of a bank or other water containment structure, broadly indicated at 40. The bank 40 has a gentle inclined slope 41 which blends at one edge imperceptibly into the adjoining landscape surface. The bank slope 41 rises in a gentle curve to its intersection with a substantially vertical rough eroded bank face 42. Banks 40 are most advantageously fabricated as elongated wedge-shaped ribbons. Placed with the bank face 42 toward and abutting a water accessory, a plurality of bank segments 40 may be placed along both sides of a flowing water accessory or aligned along the edge of a lake or other large body of water.

Banks may be fabricated in shapes other than the straight configuration of FIG. 3. For example, they may be shaped to match specialized water features such as stream forks; or in a rough circle for small ponds; or in a very small circle with a diameter equal to the width of a flowing water accessory to represent a spring. Colored appropriately during or after fabrication, the inclined slope 41 is preferably decorated with model railroad flocking and the bank face 42 dry brushed or washed an earth color.

Figure 4:
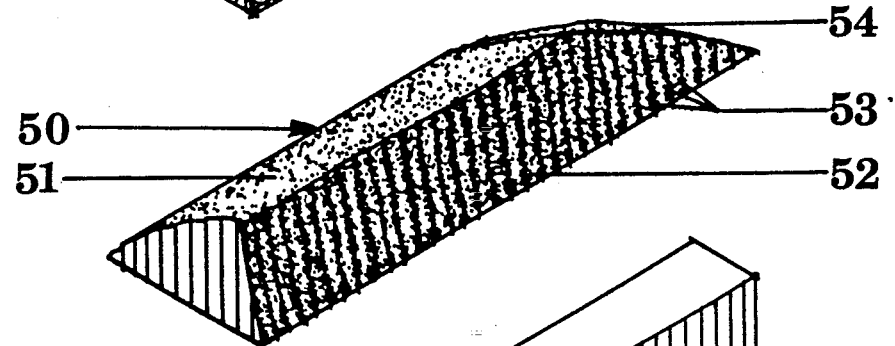
FIG. 4 is a perspective view of a flexible accessory shaped and decorated to be a model of a segment of an earthwork.

FIG. 4 illustrates an accessory comprising a segment of an earthwork or other man-made pile of earth, broadly indicated at 50. A trench front 51 is rough, like freshly piled earth, and rises abruptly until it intersects a trench face 52. The trench face 52 in the illustrated embodiment has vertical marks 53 to represent wood pilings. The end 54 is tapered to blend with the adjoining landscape surface. Earthworks are best fabricated in long thick wedge-shaped ribbons with tapered ends. The ends may be removed for use in large assemblages. Various curves and cross sections are possible to simulate revetments, gun emplacements, etc. Earthworks may be decorated similarly to dirt roads.

Figure 5:
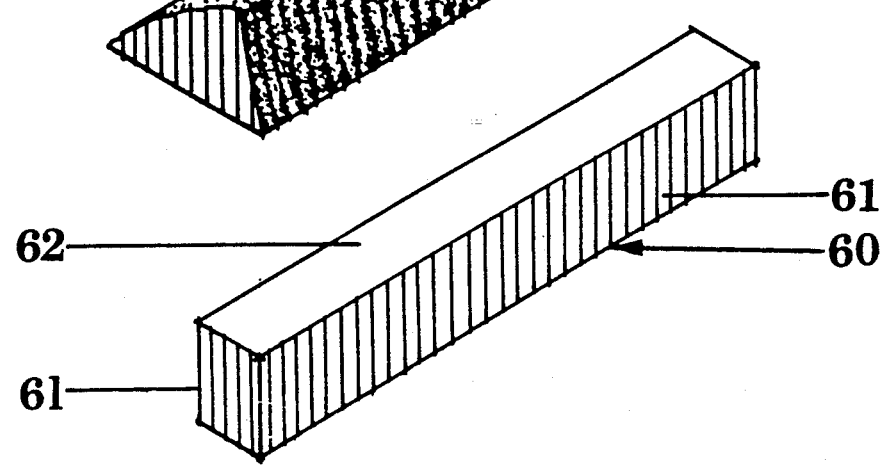
FIG. 5 is a perspective view of a flexible accessory shaped and decorated to be a model of a segment of a wall.

FIG. 5 illustrates an accessory comprising a wall or other masonry accessory, broadly indicated at 60. The face 61 of the wall rises vertically on both sides of the illustrated embodiment to a horizontal top wall surface 62. Rough or smooth, wall surfaces 61 and 62 may show rocks, bricks, stucco, etc. Fabricated in oblong rectangular strips, walls may be mitered to make sharp corners, or special corner pieces can be made. Walls may be decorated in appropriate colors such as previously described for roads.

Flexibility-FIGS. 6-9

Figures 6, 7, 8, 9:
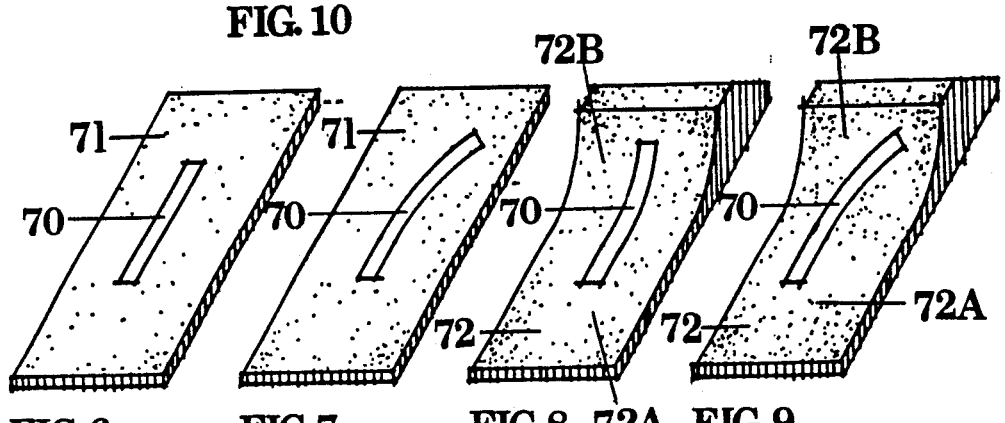
FIG. 6 is a perspective view of a flexible accessory shaped and decorated to be a model of a segment of road assembled on a flat landscape surface.
FIG. 7 is a perspective view of the flexible accessory of FIG. 6 assembled in a horizontal curve on a flat landscape surface.
FIGS. 8 and 9 are perspective views of the flexible accessory of FIG. 6 assembled in conformance with the surface configuration of a contoured landscape surface.

FIGS. 6-9 illustrate the types of flexibility that are possible. FIG. 6 illustrates a typical flexible accessory 70, such as a segment of road, on a miniature landscape surface 71. Flexible accessory 70 is not part of the structure of the landscape surface 71 but merely rests on top of it. Accessory 70 is straight both vertically and horizontally throughout its entire length.

FIG. 7 illustrates the advantage of horizontal flexibility in the accessory 70. Here, the accessory 70 is formed into a curve while being positioned on the landscape surface 71. There is no change in the vertical dimension, but accessory 70 does curve throughout its length in the plane of landscape surface 71.

FIG. 8 illustrates the advantage of vertical flexibility in the accessory 70. Landscape surface 72 in FIG. 8 is contoured with a flat surface 72A and an inclined surface 72B. Flexible accessory 70 rests on both the flat surface 72A and the inclined surface 72B and its flexibility enables accessory 70 to conform with both flat surface 72A and inclined surface 72B. Thus, accessory 70 maintains contact over its entire length with landscape surface 72.

FIG. 9 illustrates both horizontal and vertical flexibility. Accessory 70 rests on the landscape surface 72. Flexible accessory 70 bends into a gentle curve on the inclined surface 72B, and thus demonstrates the advantage of horizontal and vertical flexibility.

Flexibility materials are those that will bend both horizontally as in FIG. 7 and vertically as in FIG. 8. Most advantageous are soft plastics like flexible polyvinyl chloride which will bend in both planes simultaneously as in FIG. 9.

Assemblages of Accessories-FIGS. 10 and 11

Taking realistically contoured models such as those illustrated in FIGS. 1-5 and using the flexibility illustrated in FIGS. 6-9, it is possible to obtain the results shown in FIGS. 10 and 11.

FIG. 10 illustrates miniature landscape surface 80 having a large hill 81 as part of its structure. Resting on top of the decorated landscape are three normal road accessories or segments of accessories 82, 83, 84, and one "T" shaped intersection accessory 85. The accessories 82, 83, 84, and 85 have been assembled in end-to-end relation to each other on the landscape surface 80 and hill 81 to form a continuous assemblage or roadwork 86.

FIG. 11 shows the same landscape surface 80 and hill 81 with the same accessories 82, 83, 84, and 85 assembled in a different end-to-end relation to form a different assemblage or roadwork 87. Although the roadworks 86 (FIG. 10) and 87 (FIG. 11) are made with the same accessories on the same landscape surface, the configurations of the two roadworks are completely different. The difference in the configurations is made possible because the flexible accessories 82, 83, 84, and 85 have the capability of being successively bent in different directions. Note that accessory 84 in FIG. 10 is bent to the left and in FIG. 11 it is bent to the right. The shapes of the other individual accessories are also changed from FIG. 10 to FIG. 11. This same principle characterizes all of the terrain accessories shown in FIGS. 1-5.

Summary

Miniature terrain accessories which rest on top of the finished surface of miniature landscape surfaces after the underlying topography of hills and valleys is complete may be fabricated from a homogenous flexible material, preferably poylvinyl chloride for such accessories as roads, streams and banks, earthworks, and walls. These accessories may be assembled individually or in combinations to create various landscape scenes. For example, a stream bank and a short road accessory may be combined to provide a road fording a stream. Accessories intended for one use may be used for another purpose, such as a stream bank being placed on a hillside to create the face of a cliff.

The use of the flexible accessories of this invention is not limited to adventure games or model railroading. The accessories may be used in architectural models, dioramas, etc. If desired, the accessories may be permanently attached to a landscape surface with an appropriate adhesive after the structure of the landscape surface but before the landscape surface is decorated.

It is recognized that flexibility is not required or desired in all accessories for miniature landscapes. Models of hollow masonry or other buildings, where in flexibility is required, are better made from rigid materials. The same is true for trees and plants that are supported on slender trunks or stems and do not form a continuous mass from top to bottom.

Although specific terms have been used in describing the invention, they have been used in a generic and descriptive sense only and not for the purpose of limitation, the scope of the invention being defined in the claims, when considered with this specification and the prior art.

I claim:

1. Miniature accessories suitable for use in miniature gaming on a miniature landscape surface in which said miniature accessories are changed for each game and wherein the miniature landscapes include simulated hills and valleys which are traversed by miniature accessories, and wherein the improvement comprises preformed bulky ribbon-like miniature accessories that are flexible both horizontally and vertically at the same time throughout their length while maintaining a uniform transverse dimension, whereby the miniature accessories may be readily shaped into horizontal curves that also conform with vertically variable terrain.

2. The invention of claim 1 wherein the miniature accessories can be bent as required and will hold a desired shape for as long as needed, after which it can be taken up and reused in the same or different curvature.

3. The invention of claim 2 wherein the miniature accessories are made from polyvinyl chloride.

4. Miniature accessories according to claim 1 wherein the miniature accessories may be colored to look like roads or streams and shaped horizontally and vertically to conform with the topography of different miniature landscapes while being curved as are roads and streams.

* * * * *